No. 797,925. PATENTED AUG. 22, 1905.
G. P. THOMAS.
TEMPORARY FASTENING.
APPLICATION FILED AUG. 12, 1904.

Witnesses:
Inventor:
George P. Thomas
by his Attorneys Howson & Howson

UNITED STATES PATENT OFFICE.

GEORGE P. THOMAS, OF STEELTON, PENNSYLVANIA.

TEMPORARY FASTENING.

No. 797,925.     Specification of Letters Patent.     Patented Aug. 22, 1905.

Application filed August 12, 1904. Serial No. 220,573.

*To all whom it may concern:*

Be it known that I, GEORGE P. THOMAS, a citizen of the United States, residing at Steelton, Pennsylvania, have invented certain Improvements in Temporary Fastenings, of which the following is a specification.

My invention relates to certain improvements in temporary fastenings for which a patent was granted to me January 31, 1905, No. 781,571.

The object of my present invention is to provide means for preventing the lateral displacement of the nut when in position upon the bolt.

My invention also enables me to use any form of screw-thread in the bolt and nut.

Figure 1:
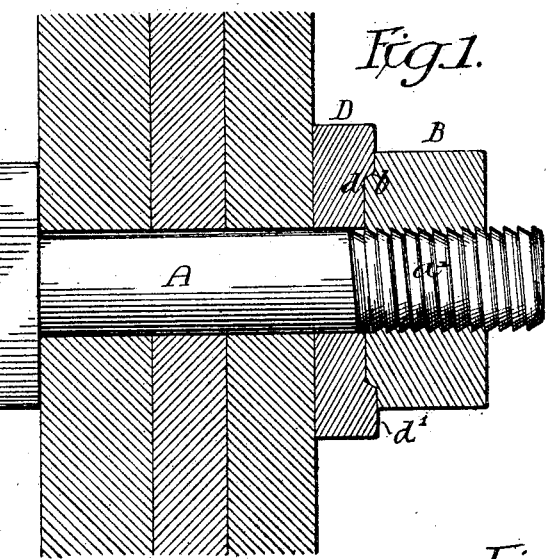
Figure 2:
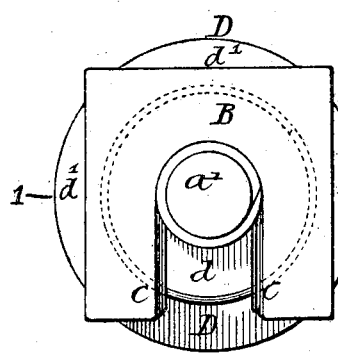
Figure 4:
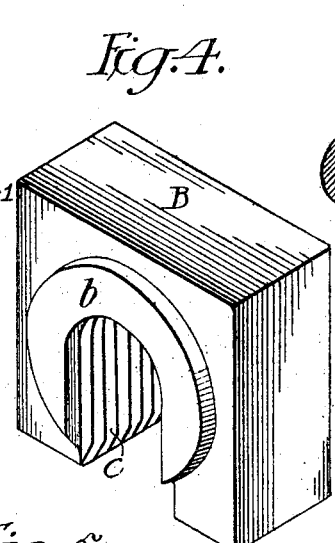
Figure 3:
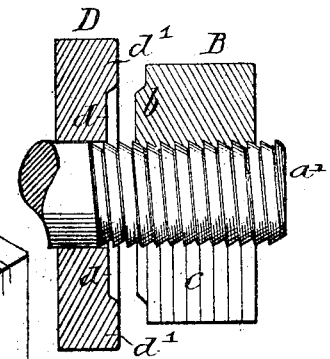
Figure 6:
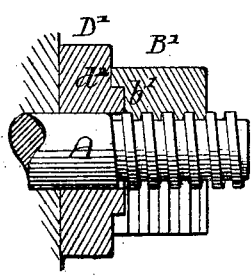
Figure 5:
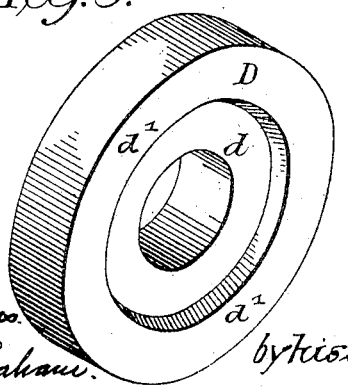
Figure 7:
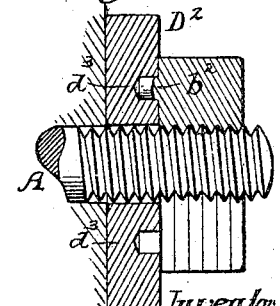

In the accompanying drawings, Figure 1 is a sectional view of my improved temporary fastening on the line 1 1, Fig. 2. Fig. 2 is an end view. Fig. 3 is a sectional view showing the nut placed in position ready to be screwed upon the bolt. Fig. 4 is a detached perspective view of the nut. Fig. 5 is a detached perspective view of the washer. Figs. 6 and 7 are views of modifications of my invention.

A is a bolt having a head $a$ and a threaded portion $a'$. The face of the thread is at right angles to the longitudinal line of the bolt, and the back of the thread is beveled.

B is the nut, having an opening $b$ at one side, so that the nut can be placed over the bolt at any point. The threads $b'$ on the nut correspond with the thread on the bolt, and the threads extend on the side walls $c c$ of the nut, as clearly shown in Figs. 3 and 4, similar to the threads of the nut of the above-mentioned patent.

For ordinary work the threaded bolt with the open-sided nut will answer to temporarily hold the pieces together; but when it is desired to shift the pieces or place any unusual strains upon them I desire to provide means for locking the nut so that it will be impossible to jar it from its hold upon the bolt. I therefore provide a washer D, having a cavity $d$ in one face, forming an annular retaining-rib $d'$, as clearly shown in Fig. 5. The walls of the cavity are preferably beveled, as illustrated, and on the nut is a circular projection $b^2$, which fits the cavity $d$ in the washer, so that when the nut is turned to clamp the parts firmly its projection is within the cavity of the washer, as shown in Fig. 1, and the annular rib $d'$ prevents any lateral movement of the nut on the bolt. Thus the nut cannot be detached without backing it off so as to first clear the rib on the washer, when it can be readily removed.

If it is desired to hold two or more pieces together, as shown in Fig. 1, the bolt is forced through the openings in the several pieces, the washer is slipped upon the bolt, then the nut is slipped over the bolt directly in front of the washer, and by giving the nut one or more turns its projections will enter the recess. The nut will draw the bolt, so as to hold the parts firmly in position, and the rib on the washer will lock the nut against lateral movement.

In many establishments where large quantities of temporary fastenings are used, such as in bridge or structural iron works, the ends of the temporary bolts are so battered that ordinary nuts cannot be screwed upon the ends of the bolts; but by using my improved nut, which is slipped onto the bolt at a point some distance from the battered end, the end of the bolt may be battered without making it useless. In fact, in some instances the bolt may be plain at the end, if desired.

It will be understood that a square thread or even a V-shaped thread may be used without departing from my invention, as shown in Figs. 6 and 7, as after the nut is once in place the washer resists the tendency of the nut to move laterally away from the bolt.

In Fig. 6 I have shown the washer D' having a projection $d^2$, which is, in fact, a rib, fitting in a recess $b^2$ in the nut B', and in Fig. 7 I have shown a pin $b^3$ on the nut, arranged to enter an annular groove $d^3$ in the washer D², each wall of said groove forming a rib coöperating with the pin, as in the previously-described forms, to prevent lateral displacement of the nut.

I claim as my invention—

1. The herein-described temporary fastening consisting of a bolt having a screw-thread thereon and a head at one end adapted to bear against one face of the piece of work through which the bolt is passed, and two retaining elements comprising a washer adapted to bear against the other face of said piece of work and an open-sided nut having threads meshing with the thread of the bolt, one of said retaining elements having an annular recess and a projection on the other of said elements cooperating with said recess to prevent lateral displacement of the nut, substantially as described.

2. The herein-described temporary fastening consisting of a bolt having a screw-thread thereon, and a head at one end adapted to bear against one face of the piece of work through which the bolt is passed, an open-sided nut having threads meshing with the threads of the bolt and a washer having an annular recess, said nut having a projection arranged to enter the recess in the washer, substantially as described.

In testimony whereof I have signed my name to this specification in the presence of two subscribing witnesses.

GEO. P. THOMAS.

Witnesses:
    JOHN H. SNAVELY,
    FREDERICK PEITER.